(12) United States Patent  (10) Patent No.: US 8,112,852 B2
Mendolia et al.  (45) Date of Patent: Feb. 14, 2012

(54) RADIO FREQUENCY TUNABLE CAPACITORS AND METHOD OF MANUFACTURING USING A SACRIFICIAL CARRIER SUBSTRATE

(75) Inventors: Greg Mendolia, Hollis, NH (US); Bill Macropoulos, Norfolk, MA (US)

(73) Assignee: Paratek Microwave, Inc., Nashua, NH (US)

( * ) Notice: Subject to any disclaimer, the term of this patent is extended or adjusted under 35 U.S.C. 154(b) by 843 days.

(21) Appl. No.: 12/152,350

(22) Filed: May 14, 2008

(65) Prior Publication Data

US 2009/0284895 A1  Nov. 19, 2009

(51) Int. Cl.
*H01G 9/00* (2006.01)
(52) U.S. Cl. .................. 29/25.42; 29/25.41; 361/277
(58) Field of Classification Search .............. 29/592.1, 29/25.35–25.42, 876–884; 361/280–283, 361/276–277
See application file for complete search history.

(56) References Cited

U.S. PATENT DOCUMENTS

| | | | |
|---|---|---|---|
| 5,312,790 A | 5/1994 | Sengupta et al. | 501/137 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupat et al. | 428/699 |
| 5,694,134 A | 12/1997 | Barnes | 343/700 |
| 5,696,662 A * | 12/1997 | Bauhahn | 361/298.1 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |
| 5,990,766 A | 11/1999 | Zhang et al. | 333/205 |
| 6,074,971 A | 6/2000 | Chiu et al. | 501/139 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,433,375 B1 * | 8/2002 | Carlsson et al. | 257/295 |
| 6,492,883 B2 | 12/2002 | Liang et al. | 333/132 |
| 6,514,895 B1 | 2/2003 | Chiu et al. | 501/137 |
| 6,525,630 B1 | 2/2003 | Zhu et al. | 333/205 |
| 6,531,936 B1 | 3/2003 | Chiu et al. | 333/164 |
| 6,535,076 B2 | 3/2003 | Partridge et al. | 333/17.1 |
| 6,538,603 B1 | 3/2003 | Chen et al. | 342/372 |
| 6,556,102 B1 | 4/2003 | Sengupta et al. | 333/161 |
| 6,590,468 B2 | 7/2003 | du Toit et al. | 333/17.3 |
| 6,597,265 B2 | 7/2003 | Liang et al. | 333/204 |
| 7,291,561 B2 * | 11/2007 | Ma et al. | 438/691 |

* cited by examiner

*Primary Examiner* — Minh Trinh

(74) *Attorney, Agent, or Firm* — Andrew Gust; Guntin Meles & Gust, PLC

(57) ABSTRACT

An embodiment of the present invention provides a method, comprising manufacturing capacitors by creating a wafer using a substrate as a sacrificial carrier for the construction of said capacitor; and removing said sacrificial carrier wafer once said capacitor processing is complete.

28 Claims, 4 Drawing Sheets

GRIND AWAY MOST OF SACRIFICIAL SILICON WAFER
—510

ETCH AWAY ANY OF REMAINING SACRIFICIAL SILICON WAFER, STOPPING AT DIELECTRIC BARRIER/INTERFACE
—610

RADIO FREQUENCY TUNABLE CAPACITORS AND METHOD OF MANUFACTURING USING A SACRIFICIAL CARRIER SUBSTRATE

BACKGROUND

Tunable RF capacitors fabricated on wafers have traditionally been made on substrates such as sapphire, silicon, alumina, and a host of other substrates. These substrates are a necessary evil to provide a mechanical medium on which to fabricate the capacitors, traditionally with standard semiconductor processes such as sputtering, etching, vapor deposition, photo-lithography, and so on. Once the processing is complete, the wafer is singulated by scribing or sawing and the individual circuits are packaged or used in bare die form within other circuits.

But each substrate has its pros and cons. Silicon is a very lossy substrate at RF frequencies, even high resistivity silicon, which "converts" back to lossy silicon when exposed to some of the higher temperature process steps needed in the fabrication of these parts. Sapphire is more expensive, and often is not compatible within silicon lines due to contamination issues. Alumina is limited in diameter and has issues of flatness. Ideally, no substrate is wanted, but the capacitors must be fabricated on something until they can be mechanically captured in the packaging material, typically plastic.

Consequently, there is a strong need for an invention which may solve the shortcomings set forth above.

SUMMARY OF THE INVENTION

An embodiment of the present invention provides a method, comprising manufacturing capacitors by creating a wafer using a substrate as a sacrificial carrier for the construction of the capacitor; and removing the sacrificial carrier wafer once the capacitor processing is complete. An embodiment of the present invention may further comprise placing a thin layer of insulator onto the sacrificial carrier wafer, fabricating the capacitor by first depositing metal for a bottom electrode on the insulator, then depositing a dielectric material on top of the bottom electrode and placing a top electrode of the capacitor on the dielectric material, then overmolding the wafer, grinding the overmold to a desired level, then grinding/etching the sacrificial wafer away, and finally singulating the wafer into individual parts/chips.

This embodiment may further comprise processing any needed resistors and interconnects and protecting the capacitors and other supporting circuits with a passivation layer prior to the overmolding and opening the protective passivation layers where contacts are needed; and then adding any preferred metal stud or ball interconnections to the openings while the wafer is still intact.

Still another embodiment of the present invention provides an apparatus, comprising an RF capacitor, wherein the RF capacitor is fabricated onto a sacrificial wafer that is subsequently removed after fabrication of the apparatus. The method of manufacturing the RF capacitors of an embodiment of this apparatus may further comprise placing an insulating layer onto the wafer, forming the RF capacitor on the insulating layer, overmolding the entire wafer, grinding the overmolding down to expose connections and adding solder balls to the connections, inserting wax over the overmolding to hold a temporary wafer mounted on the wafer, grinding away most of all of the sacrificial carrier substrate wafer and etching away any remaining sacrificial wafer and stopping at the insulating layer.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
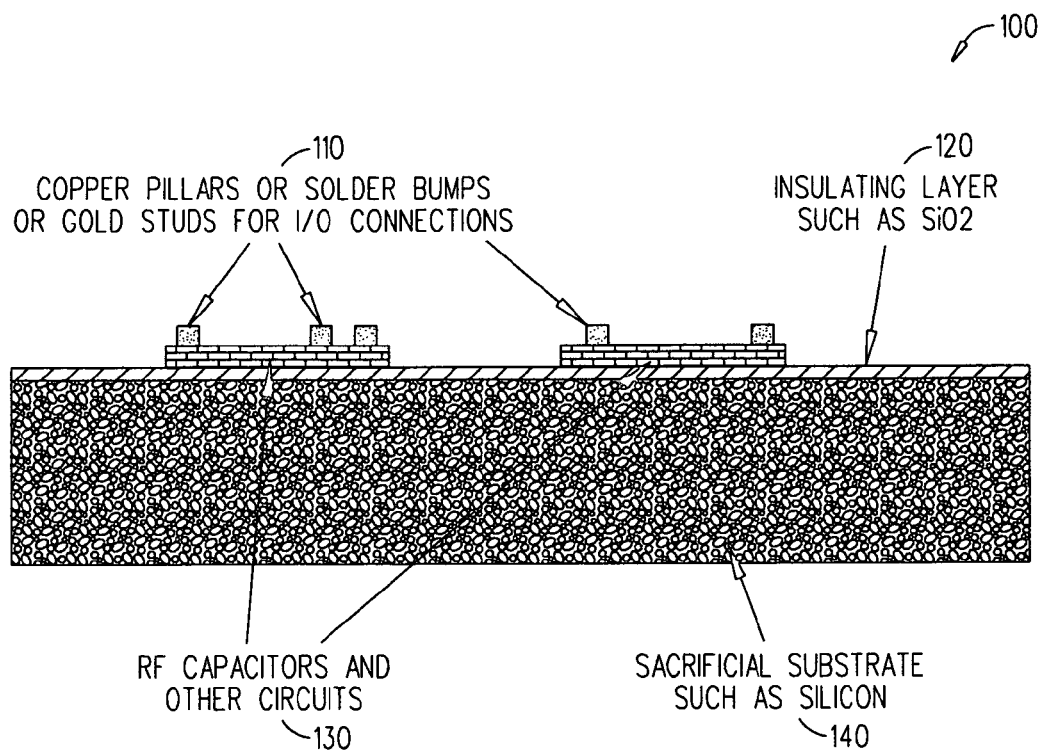
FIG. 1 illustrates providing a sacrificial substrate of an embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, and/or that the two or more elements co-operate or interact with each other (e.g. as in a cause an effect relationship).

An embodiment of the present invention provides the use of a substrate as a sacrificial carrier for the construction of capacitors and possible other circuits, and once the capacitor processing is complete, removal of the substrate completely.

Traditionally the process for the construction of capacitors and other circuits using, for example, but not limited to, a sapphire substrate wafer with existing technologies may have included:

1. process a thin (e.g., but limited to this thickness) approximately 1 um layer of insulator onto a sapphire wafer, such as SiO2, to provide a more smooth base on which to process the capacitors and other supporting circuits such as bias resistors and interconnects—it is understood that this step may be skipped if the wafers used are flat enough to begin with, having minimal or no surface defects/pitts/imperfections;

2. fabricate the capacitors by first depositing metal for the bottom electrode, then the dielectric such as BST, Parascan®, or other similar material, and the top electrode of the capacitor, with appropriate masking and etching steps to define these geometries/features, as is commonly done in wafer fabrication.

3. repeat the above step if capacitors are stacked on top of each other;

4. process any needed resistors, inductors, fixed capacitors, transmission lines, active devices, other microwave components and interconnects;

5. protect the circuits with a passivation layer if desired;

6. open the protective passivation layer where contacts are needed to the chips;

7. add any preferred metal stud or ball interconnections such as Cu or gold bumps/studs or solder balls to these openings (this step can be skipped if the chips will not be flipped mounted, and instead will be used and connected to with standard wire bond techniques) while the wafer is still intact;

8. saw or scribe or laser cut the wafer to singulate the circuits;

9. package the parts using standard plastic overmold processes, or wafer scale packaging, or lead frame (this step might be skipped if bare die are all that is needed, for use within other modules/packages);

In contrast, an embodiment of the present invention provides that a method of manufacturing of the present invention may include:

1. Process a thin ~3-5 um layer of insulator onto a silicon wafer, such as, but not limited to, SiO2 or glaze, to provide a more smooth base on which to process the capacitors and other supporting circuits such as bias resistors and interconnects. Again, this step may be skipped if the wafers used are flat enough to begin with, having minimal or no surface defects/pitts/imperfections. This layer will have a secondary and very critical function of protecting the capacitors and adding a "buffer layer" or "stop layer" between the capacitors/other circuits and the silicon substrate. This will simplify the removal of the "sacrificial" silicon (or other material) substrate at the end of the processing of the circuits;

2. Fabricate the capacitors by first depositing metal for the bottom electrode, then the dielectric, such as but not limited to, BST, Parascan®, or other similar material, and the top electrode of the capacitor, with appropriate masking and etching steps to define these geometries/features, as is commonly done in wafer fabrication;

3. Repeat the above step if capacitors are stacked on top of each other;

4. Process any needed resistors, inductors, fixed capacitors, transmission lines, active devices, other microwave components and interconnects;

5. Protect the circuits with a passivation layer if desired;

6. Open the protective passivation layer where contacts are needed to the chips;

7. Add any preferred metal stud or ball interconnections such as Copper, Gold pillars/studs for enhance thermal management or solder balls to these openings, or similar connection technologies that will enable soldering or thermosonic bonding of package;

8. Overmold the entire wafer with plastic standard encapsulant or similar material. This will later provide mechanical integrity to the wafer and circuits. Alignment features can be designed into the wafer so it can later be more easily singulated even with the opaque (typically black) plastic covering the circuits. This can be done in many ways. One way is to simply not cover 100% of the wafer, and just leave 2-5 mm (although the present invention is not limited by these dimensions which are for exemplification only) around the circumference of the wafer protected/blocked off with no overmold, so the circuits and more importantly the "streets" can be clearly seen. These streets or other alignment features can then be used in later steps to determine where to cut or scribe the wafer into individual parts;

9. Grind the overmold down until the copper pillars or solder balls are exposed through the plastic;

10. Plate or drop new solder balls onto each copper pillar connection or solder ball connection;

11. Flip the wafer+circuits+plastic overmold over, and grind as much of the wafer away as possible without removing any of the insulator layer (deposited in step 1). How much of the silicon wafer remaining will depend on the tolerance used. If the insulating layer in step one is thick enough and the grinding tolerances tight enough, the entire silicon substrate can be removed even if some of the insulator is removed as well, as long as the capacitors and other circuits are not compromised;

12. Typical grinding tolerances may only be accurate to +−15 um, which means that some of the silicon wafer will still be present after grinding. In this case, the remaining silicon can be removed using standard chemical etching processes. Care may be needed to make sure the plastic overmold or circuits are not damaged, and the chemical etching is stopped before etching deeply into the passivation from step 1. This should be easy to do by masking off the plastic or creating a mechanical barrier, and choosing a chemical etch that will remove silicon but is not very reactive with the passivation material;

13. Once the silicon wafer is completely removed, the plastic overmold will act as a "wafer" to provide mechanical stability and integrity for the circuits comprised of the capacitors, resistor, and interconnects. Now the "plastic wafer and circuits can be singulated using standard techniques like sawing—although the present invention is not limited in this respect. The exposed streets on the circuits or other alignment features can now be used to determine where exactly to saw the wafers and sigulate the parts;

14. The parts are now complete including packaging of the parts in plastic and connections through the solderballs for standard assembly onto other circuit boards or modules.

Alternatively, if more mechanical strength is needed before the silicon sacrificial wafer can be ground/etched away, the wafer+plastic can be mounted on a second temporary wafer using standard semiconductor techniques such as wax mounting. Once mounted via wax, significantly more mechanical rigidity will be created, allowing for the next physical and chemical steps to be performed.

Yet another option to increase mechanical rigidity before removing the silicon wafer, is to not grind the plastic overmold down (step 9 above) at this point in the process, leaving a thicker more rigid plastic layer to support the capacitor structures and circuits. The silicon wafer is then ground/etched away while there is a thick layer of plastic. Once this is complete, more plastic or similar material can be added where the silicon wafer was (opposite side of the circuits, so you have a plastic-circuits-plastic sandwich), and only then grind the original layer of plastic down to expose the copper pillars and add the solder bumps for the electrical connections. This will further address any concerns of environmental reliability A further embodiment of the present invention provides to not mold plastic over the wafer until the sacrificial substrate is removed. This can be done by first mounting the wafer upside-down on a second temporary wafer using standard semiconductor techniques such as wax, then grinding/etching the silicon wafer away. Next, the wafer can be flipped/remounted via wax to a third wafer to expose the contact side of the wafer and finally covered with plastic and singulated.

Still further variations can be made to reduce this invention to practice, but a key feature of embodiment of the present invention provides the entire removal of the original carrier wafer so as to make it a sacrificial substrate which will at the end of the process not be part of the circuit/product.

Turning now to the figures, FIG. 1 at 100 illustrates a possible step including using a sacrificial substrate 140 overlaid by a insulating layer 120 on which may be placed RF capacitors and other circuits 130. Copper pillars or solder bumps or gold studs may be used for I/O connections 110 for the RF capacitors and other circuits.

Figure 2:
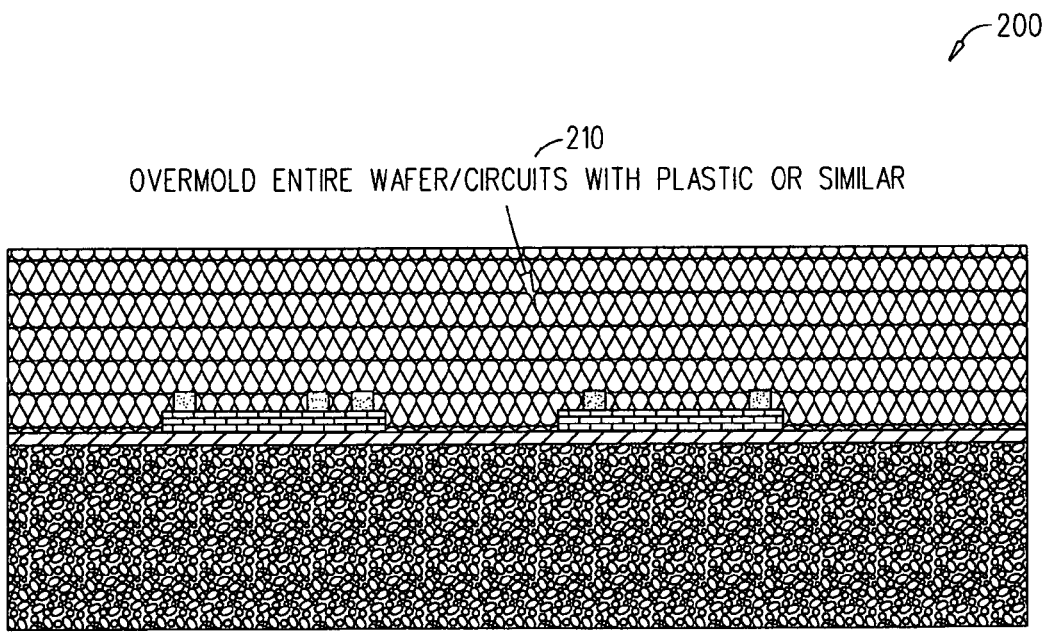
FIG. 2 illustrates a possible step of including an overmold of an embodiment of the present invention.
Figure 3:
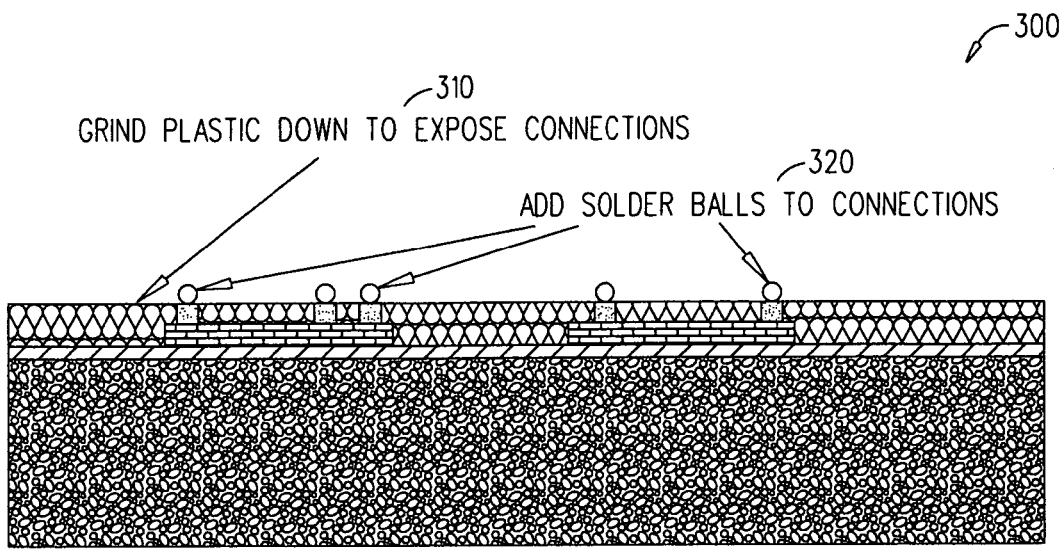
FIG. 3 illustrates a possible step including grinding plastic down to expose connections and adding solder balls to the connections of an embodiment of the present invention.

Looking now at FIG. 2 at 200 is an illustration of a possible step including an overmold 210 of RF capacitors 110 of an embodiment of the present invention. FIG. 3 shown generally as 300 illustrates a possible step including grinding plastic down to expose connections 310 and adding solder balls 320 to said connections of an embodiment of the present invention.

Figure 4:
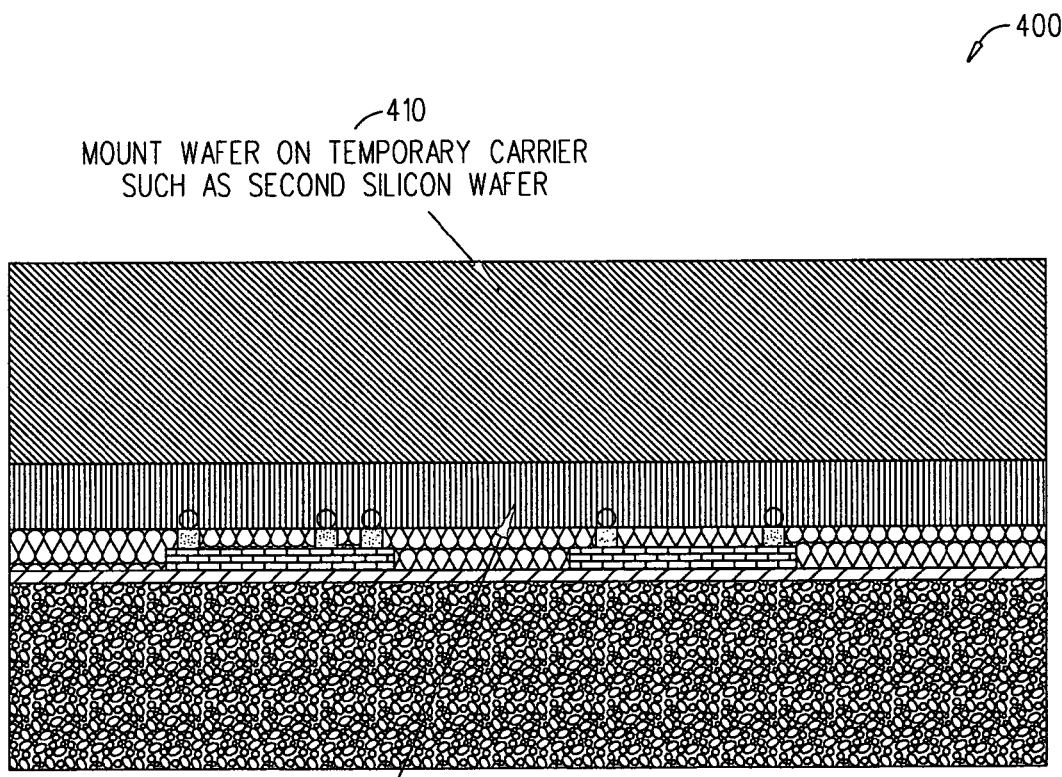
FIG. 4 illustrates a possible step including using a wax to hold a ware onto a carrier and mounting a wafer on a temporary carrier of an embodiment of the present invention.
Figure 5:
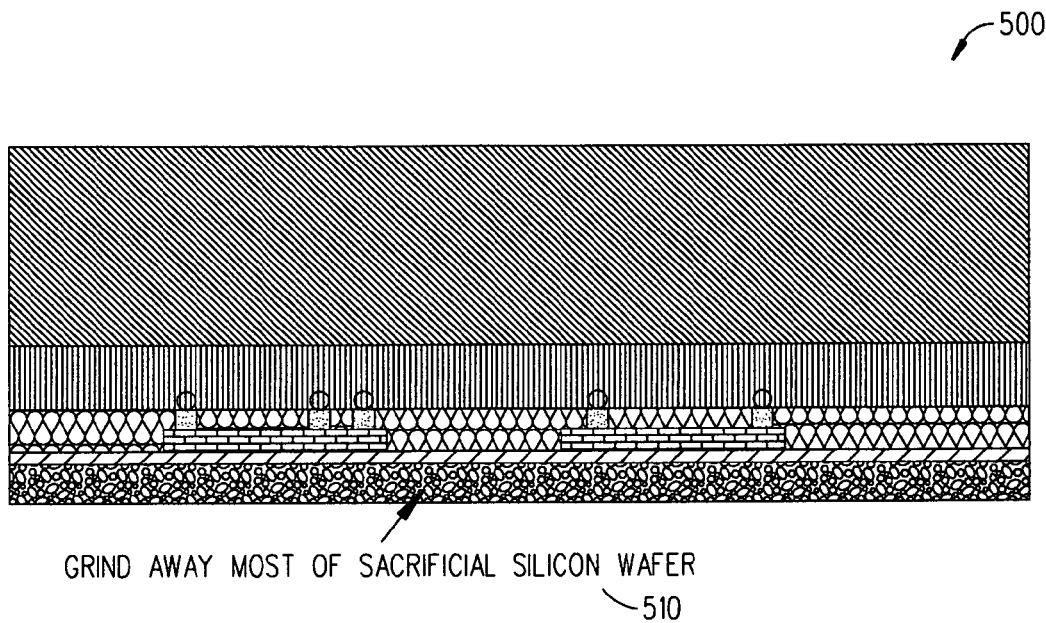
FIG. 5 illustrates a possible step including grinding away most sacrificial wafer of an embodiment of the present invention.
Figure 6:
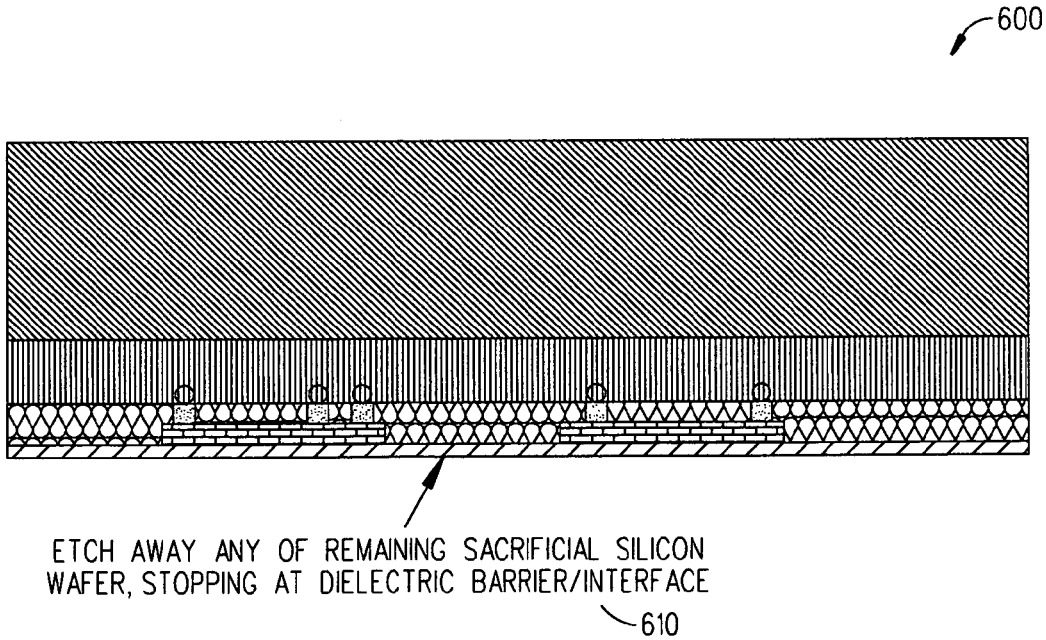
FIG. 6 illustrates a possible step including etching away any of the reaming sacrificial wafer of an embodiment of the present invention.

FIG. 4 at 400 illustrates a possible step of including a wax 420 to hold a wafer onto a carrier and mounting a wafer such as, but not limited to, a second silicon wafer 410 on a temporary carrier of an embodiment of the present invention. FIG. 5 at 500 illustrates a possible step including grinding away most sacrificial wafer 510 of an embodiment of the present invention and FIG. 6 at 600 illustrates etching away 610 any of the reaming sacrificial wafer of an embodiment of the present invention.

Figure 7:
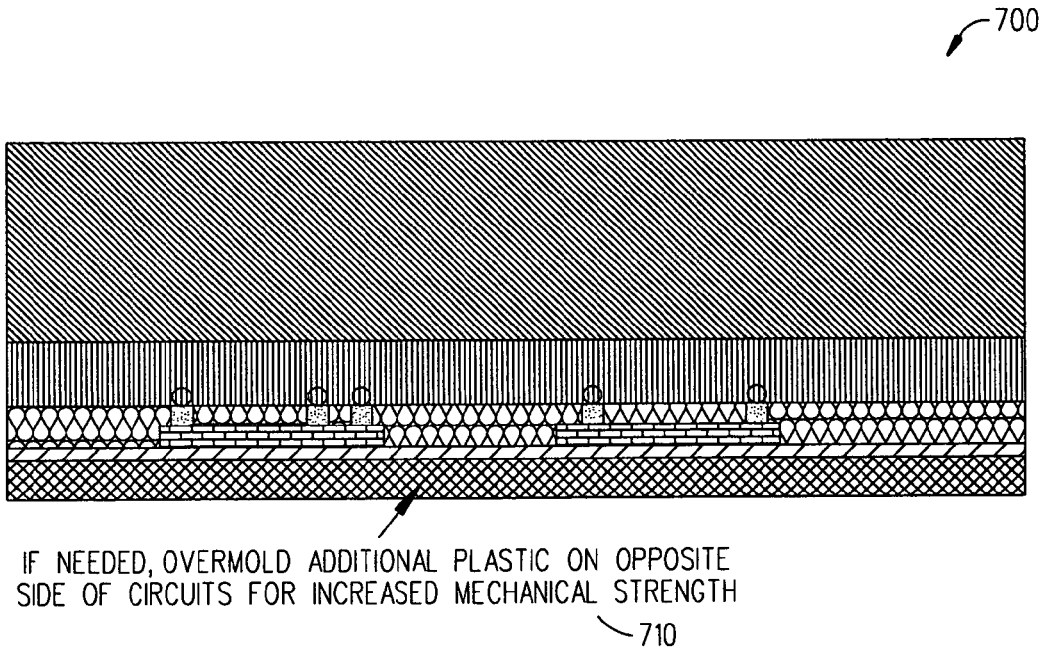
FIG. 7 illustrates a possible step of including overmolding additional plastic on opposite side of circuits for increased mechanical strength of an embodiment of the present invention.
Figure 8:
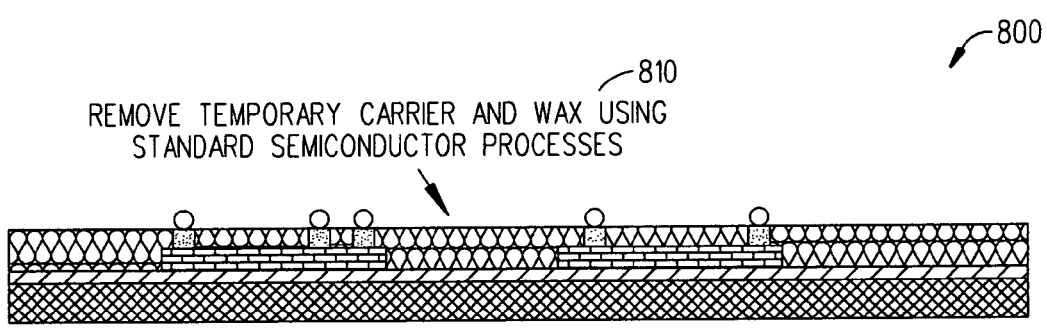
FIG. 8 illustrates removing temporary carries and wax using standard semiconductor processes of an embodiment of the present invention.
Figure 9:
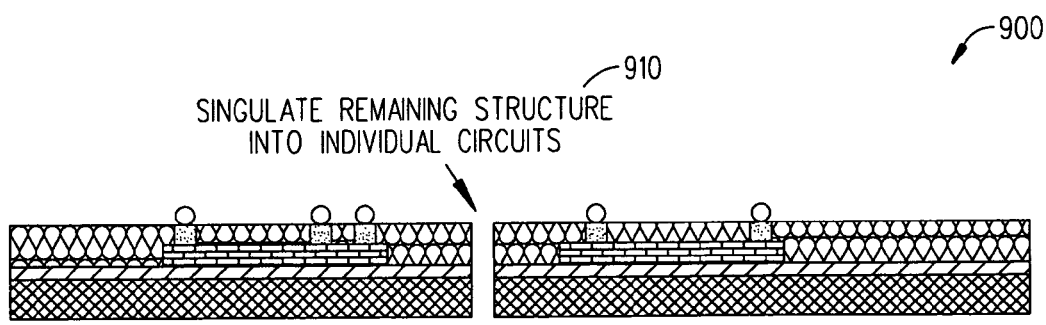
FIG. 9 illustrates singulating remaining structure into individual circuits of an embodiment of the present invention.

FIG. 7 at 700 depicts including overmolding additional plastic on opposite side of circuits for increased mechanical strength 710 of an embodiment of the present invention, while FIG. 8 illustrates removing temporary carries and wax using standard semiconductor processes of an embodiment of the present invention. Finally, in FIG. 9 illustrates singulating remaining structure into individual circuits of an embodiment of the present invention.

Important aspects and key benefits of various embodiments of the present invention may include:
1. Far greater choice in sacrificial wafer used, since it will be removed at the end of the process, allowing the use of wafers such as silicon and avoiding the issues of contamination of standard semiconductor lines from wafers such as sapphire;
2. Lower grades of silicon (or other) wafers can be chosen that are less expensive;
3. Saw streets can be made smaller since you now have to cut through plastic, not silicon, allowing for more parts from one wafer;
4. Because of the elimination of contamination issues with wafers such as sapphire, RF capacitors and circuits can now be fabricated in standard silicon fabs, sharing capital equipment needed on those lines, rather than having to invest in an entirely separate line. This significantly reduces capex expenditure and associated depreciation costs, lowering overall cost to manufacture these parts;
5. The final product can be designed to be much thinner since there is no longer a silicon (or other material) wafer as part of the final packaged product further enabling benefit # 3;
6. There is no longer any possibility of problems with mismatch of temperature coefficient of expansion between the material used to make the RF capacitors, and the carrier wafer itself, since the wafer will be removed at the end of the process;
7. There is no longer any possibility of performance degradation caused by the carrier wafer itself, since the wafer will be removed at the end of the process;

While the present invention has been described in terms of what are at present believed to be its preferred embodiments, those skilled in the art will recognize that various modifications to the disclose embodiments can be made without departing from the scope of the invention as defined by the following claims.

What is claimed is:

1. A method of manufacturing a tunable capacitor, comprising:
   fabricating a tunable capacitor and any desired circuits onto a sacrificial wafer;
   forming resistors and interconnects onto said wafer and protecting said circuits with a passivation layer prior to overmolding;
   opening a portion of said passivation layer for contacts;
   prior to overmolding, adding metal stud or ball interconnections for enhanced thermal management that will enable soldering or thermo sonic bonding;
   covering said wafer with an overmold;
   grinding a predetermined amount of the overmold;
   removing said sacrificial wafer; and
   singulating remaining structure into individual parts.

2. The method of claim 1, further comprising providing an insulating layer between said tunable capacitor and said wafer.

3. The method of claim 2, wherein the tunable capacitor is fabricated by depositing metal for a bottom electrode on said insulator layer, then inserting a dielectric material adjacent said bottom electrode and placing a top electrode of said capacitor on said dielectric material.

4. The method of claim 1, wherein the singulating is performed by cutting the remaining structure using at least one of sawing, scribing or laser cutting.

5. The method of claim 1, further comprising providing a second overmold where the sacrificial wafer was removed.

6. The method of claim 5, wherein the second overmold comprises plastic.

7. The method of claim 1, further comprising grinding said overmold down until said metal stud or ball interconnections are exposed.

8. The method of claim 7, further comprising plating or dropping new solder balls onto each interconnection.

9. A method of manufacturing a tunable capacitor, comprising:
   fabricating a tunable capacitor and any desired circuits onto a sacrificial wafer;
   covering said wafer with an overmold;
   grinding a predetermined amount of the overmold;
   prior to removal of said sacrificial wafer, adding wax to hold said wafer onto a temporary carrier during backside processing and mounting said wafer on the temporary carrier;
   removing said sacrificial wafer; and
   singulating remaining structure into individual parts.

10. The method of claim 9, further comprising forming resistors and interconnects onto said wafer and protecting said circuits with a passivation layer prior to overmolding.

11. The method of claim 10, further comprising opening a portion of said passivation layer for contacts.

12. The method of claim 11, further comprising prior to overmolding adding interconnections for enhanced thermal management that will enable soldering or thermo sonic bonding.

13. The method of claim 12, further comprising grinding said overmold down until said interconnections are exposed.

14. The method of claim 13, further comprising plating or dropping new solder balls onto each interconnection.

15. The method of claim 14, further comprising singulating remaining structure, wherein exposed streets on said circuits or other alignment features are used to determine where to cut the remaining structure for singulating.

16. The method of claim 9, wherein the singulating is performed by cutting the remaining structure using at least one of sawing, scribing or laser cutting.

17. The method of claim 9, further comprising providing a second overmold where the sacrificial wafer was removed.

18. The method of claim 17, wherein the second overmold comprises plastic.

19. The method of claim 9, further comprising providing an insulating layer between said tunable capacitor and said wafer.

20. The method of claim 19, wherein the tunable capacitor is fabricated by depositing metal for a bottom electrode on said insulator layer, then inserting a dielectric material adjacent said bottom electrode and placing a top electrode of said capacitor on said dielectric material.

21. A method of manufacturing a tunable capacitor, comprising:
fabricating a tunable capacitor and any desired circuits onto a sacrificial wafer;
forming resistors and interconnects onto said wafer and protecting said circuits with a passivation layer prior to overmolding;
opening a portion of said passivation layer for contacts;
prior to overmolding adding metal stud or ball interconnections for enhanced thermal management that will enable soldering or thermo sonic bonding;
covering said wafer with an overmold;
grinding a predetermined amount of the overmold;
removing said sacrificial wafer; and
singulating remaining structure into individual parts, wherein exposed streets on said circuits or other alignment features are used to determine where to cut the remaining structure for singulating.

22. The method of claim 21, further comprising providing an insulating layer between said tunable capacitor and said wafer.

23. The method of claim 22, wherein the tunable capacitor is fabricated by depositing metal for a bottom electrode on said insulator layer, then inserting a dielectric material adjacent said bottom electrode and placing a top electrode of said capacitor on said dielectric material.

24. The method of claim 21, wherein the singulating is performed by cutting the remaining structure using at least one of sawing, scribing or laser cutting.

25. The method of claim 21, further comprising providing a second overmold where the sacrificial wafer was removed.

26. The method of claim 25, wherein the second overmold comprises plastic.

27. The method of claim 21, further comprising grinding said overmold down until said metal stud or ball interconnections are exposed.

28. The method of claim 27, further comprising plating or dropping new solder balls onto each interconnection.

* * * * *